(12) United States Patent
Majkrzak (10) Patent No.: US 7,658,059 B2
(45) Date of Patent: Feb. 9, 2010

(54) SYNCHRONOUS DRIVE FOR SPLIT SICKLE BARS ON HARVESTER HEADER

(75) Inventor: David Majkrzak, West Fargo, ND (US)

(73) Assignee: Crary Industries, Inc., West Fargo, ND (US)

( * ) Notice: Subject to any disclaimer, the term of this patent is extended or adjusted under 35 U.S.C. 154(b) by 0 days.

(21) Appl. No.: 11/810,085

(22) Filed: Jun. 4, 2007

(65) Prior Publication Data

US 2008/0295478 A1 Dec. 4, 2008

(51) Int. Cl.
*A01D 34/13* (2006.01)

(52) U.S. Cl. .................................................. 56/264

(58) Field of Classification Search .............. 60/771, 60/374; 91/171, 189 A, 290, 296, 178, 297, 91/298, 319, 536; 56/264, 257, 296, 259, 56/297

See application file for complete search history.

(56) References Cited

U.S. PATENT DOCUMENTS

| 956,385 | A | * | 4/1910 | Lovett | 56/257 |
|---|---|---|---|---|---|
| 3,577,716 | A | | 5/1971 | McCarty et al. | 56/259 |
| 3,657,868 | A | * | 4/1972 | Cousino | 56/13.6 |
| 3,765,173 | A | | 10/1973 | Harris | 60/97 |
| 3,941,003 | A | * | 3/1976 | Garrison et al. | 74/44 |
| 4,216,641 | A | | 8/1980 | Koch et al. | 56/14.4 |
| 4,246,742 | A | * | 1/1981 | Clark et al. | 56/259 |
| 4,267,689 | A | * | 5/1981 | Schneider et al. | 56/53 |
| 4,487,004 | A | | 12/1984 | Kejr | 56/14.4 |
| 4,896,491 | A | | 1/1990 | Warnsholz et al. | 56/28 |
| 4,909,025 | A | * | 3/1990 | Reissig et al. | 56/257 |
| 5,048,394 | A | * | 9/1991 | McLevige et al. | 91/361 |
| 5,463,852 | A | | 11/1995 | O'Halloran et al. | 56/6 |
| 5,778,727 | A | | 7/1998 | Richardson et al. | 74/60 |
| 5,787,786 | A | | 8/1998 | Zeuner | 91/171 |
| 6,305,154 | B1 | * | 10/2001 | Yang et al. | 56/298 |
| 6,494,025 | B1 | | 12/2002 | Killen et al. | 56/11.1 |
| 6,510,681 | B2 | | 1/2003 | Yang et al. | 56/298 |
| 6,557,332 | B2 | | 5/2003 | Rhody | 56/10.9 |
| 6,837,054 | B2 | | 1/2005 | Brocard et al. | 60/771 |
| 2002/0035827 | A1 | * | 3/2002 | Yang et al. | 56/298 |
| 2004/0216440 | A1 | * | 11/2004 | Talbot | 56/296 |
| 2005/0086919 | A1 | * | 4/2005 | Stiefvater et al. | 56/10.8 |
| 2006/0042217 | A1 | | 3/2006 | Buermann | 56/256 |

* cited by examiner

Primary Examiner—Árpád Fábián-Kovács
(74) Attorney, Agent, or Firm—Wood, Phillips, Katz, Clark & Mortimer (57) ABSTRACT

A drive arrangement for split sickle bar sections of a harvester having a long cutter bar such as a combine, swather, mower-conditioner or the like utilizes separate drives for each sickle bar section, and provides for synchronizing the movement of the sickle bar sections so that they reach the respective ends of the reciprocating path simultaneously. In one form series connected first and second hydraulic motors are used, and the first motor in the series connection is reduced in speed from that which would be obtained from the full flow of a pump, by passing a portion of the pump fluid flow to a flow line leading to the second motor, a bleed valve bleeds off a portion of the flow in the flow line to regulate the second motor speed and position to match the speed and position of the first motor in response to signals indicating the position of the sickle bar sections. The sickle bar sections are thus synchronized.

21 Claims, 5 Drawing Sheets

SYNCHRONOUS DRIVE FOR SPLIT SICKLE BARS ON HARVESTER HEADER

BACKGROUND OF THE INVENTION

This disclosure relates to a drive for split sickle bars on harvester headers, such as combines, swathers, mower-conditioners and similar crop and hay cutters, where the cutter bar and sickle are long, so two sickle bar sections are reciprocated in opposite directions, and operated with separate reciprocating drives. The sickle bar sections move in opposite directions as they are separately stroked, and the present disclosure teaches synchronizing the drives so that the sickle bar sections will not go out "of time" and cause objectionable vibration.

Large harvesters and combines for harvesting grain have headers that are up to at least 36 feet long, and it is common practice to have a split sickle bar, that is, two sickle bar sections driven from the opposite ends of the header and the moving linearly in opposite directions. It is also well known to use a "wobble" drive that converts a rotary motion into a linear motion for driving the sickle bar sections. It is important that the sickle bar sections remain in time, that is, so that they complete their stroke in each direction at the same time. This minimizes vibrations and insures clean cutting of the grain stalks in the center of the header.

It is also desirable to have hydraulic motor drives for providing the rotary motion to the wobble drives. At the present time, the hydraulic motors used are generally, but not necessarily series connected. However, due to the normal internal leakage of the motors, the second motor in the series connection (the slave motor) will rotate at different rpm from the first or master motor. Small differentials in speed will cause the sickle bar sections to go in and out of "timing" or synchronization and strip the crop, rather than cut it, and also cause vibration.

At present, most split sickle bars cannot be kept in perfect synchronization, unless there are non-slip drive connections to the sickles (which are costly and have other drawbacks), so to create a non-perceptible vibration the two sickle bar sections are intentionally driven at sufficiently different speeds (for example at a 25 rpm difference) so the "beat" frequency is rapid and not highly objectionable, for example every 2 or 3 seconds. This does cause vibrations of the machines, but it is tolerated by the operators. The overlapping center sections of the two sickle bar sections will be in a position where the crop is torn or stripped, rather than cut, for short intervals of time, so while the cutting in not ideal, the tearing of the crops is intermittent, rather that for long periods of time.

The inner ends of the sickle bar sections overlap in the center of the header during their strokes, for complete cutting, and if they go out of time, the overlap length in the middle of a header will go from ideal cutting to stripping and pulling the crop being harvested. Also the mechanical imbalance of the weight and the inertia of the sickle bar sections will go from "balanced" (in sync) to totally out of balance, which is essentially with the two sections running like one long sickle bar insofar as vibrations are concerned. The vibrations can be felt by the operator, and the vibrations also reduce the life of the machine.

Attempts have been made to solve the synchronization problem. For example, U.S. Pat. No. 5,787,786 shows a dual hydraulic oscillator for a reciprocating cutter that provides for synchronizing the outputs to a split sickle bar section drive.

SUMMARY OF THE INVENTION

The present disclosure describes a drive mechanism for two sickle bar sections mounted on a single harvester header. The sickle bar sections as shown are driven in opposite directions through rotary to reciprocating drives by separate rotary input drives, one of which is considered a master drive and the other a slave drive. The master drive is driven at a set or reference speed, less than the maximum speed attainable with the slave drive, and the slave drive speed is adjusted to match the speed of the master drive and also to match the positions of the two sickle bar sections.

In one form rotary hydraulic motors are used as the drive input. A control valve that has a bypass flow control valve section is utilized. A small portion of the flow of fluid under pressure from a single pump to the first or master motor is bypassed so that the flow to the master motor is reduced from the maximum pump output. This bypass flow is diverted to a passageway carrying flow to the slave motor. The first or master motor thus runs slower than it would if it was receiving the full pump output. The flow to the first or master motor is selected to provide a speed of rotation that is lower than the speed which can be obtained by the slave motor when at least a portion of the bypass flow provided by the bypass flow control valve is added to the flow provided to the second motor or slave motor. In other words, a least a portion of the bypass flow is diverted to the second or slave motor so the slave motor has a capability of running faster than the master motor. The speed of the slave motor is controlled to match the speed of the master motor, and position sensors are also used to insure the positions of the sickle bar sections are kept the same.

Proximity sensors are utilized for determining the rpm and timing or output position differences between the master and slave drives, in one form hydraulic motors, and the signals from the sensors are fed back to a central computer controller to detect any rpm and timing or position differences between the drives or motors and then send a signal to a control to either slow down or speed up the slave drive to match the rpm of the master drive and keep the sickle bar sections reaching the ends of their strokes at the same times.

The control valve utilized with hydraulic motor drives has a bleed flow control valve for bleeding the input flow to the slave motor (which includes the bypass flow) to regulate the speed of the slave motor. The bleed flow control valve is a pulse width modulated bleed valve controlled to adjust the input flow to the slave motor, and any excess input flow not needed to match the speed of the slave motor to the speed of the master motor is diverted to tank.

By keeping the two sickle bar sections in synchronicity, there is less vibration at the reciprocating drives, and less wear and tear on the drive train as well as less harvester vibration and wear and tear. Further, there is improved cutting where the sickle bar sections overlap at or near the center of the header, so that there is a true cut of the crop rather than pulling and tearing. Balanced sickle bar sections loads permit higher operating rpm, and higher sickle speeds, which allow faster harvester ground speed. The harvester may be a combine as shown, a swather, a mower-conditioner or the like, with a long cutter bar and two sickle sections.

While the embodiment that will be primarily discussed shows the use of series connected hydraulic motors, the same control method can be applied to parallel connected hydraulic motors, as well as controlling speeds and positions of a dual belt drive head that would drive the rotary to reciprocating motion drives, by adjusting the belt tension to permit some slippage but to maintain the speed and position of a slave belt drive the same as a master belt drive.

DETAILED DESCRIPTION OF EXEMPLARY EMBODIMENTS

Figure 1:
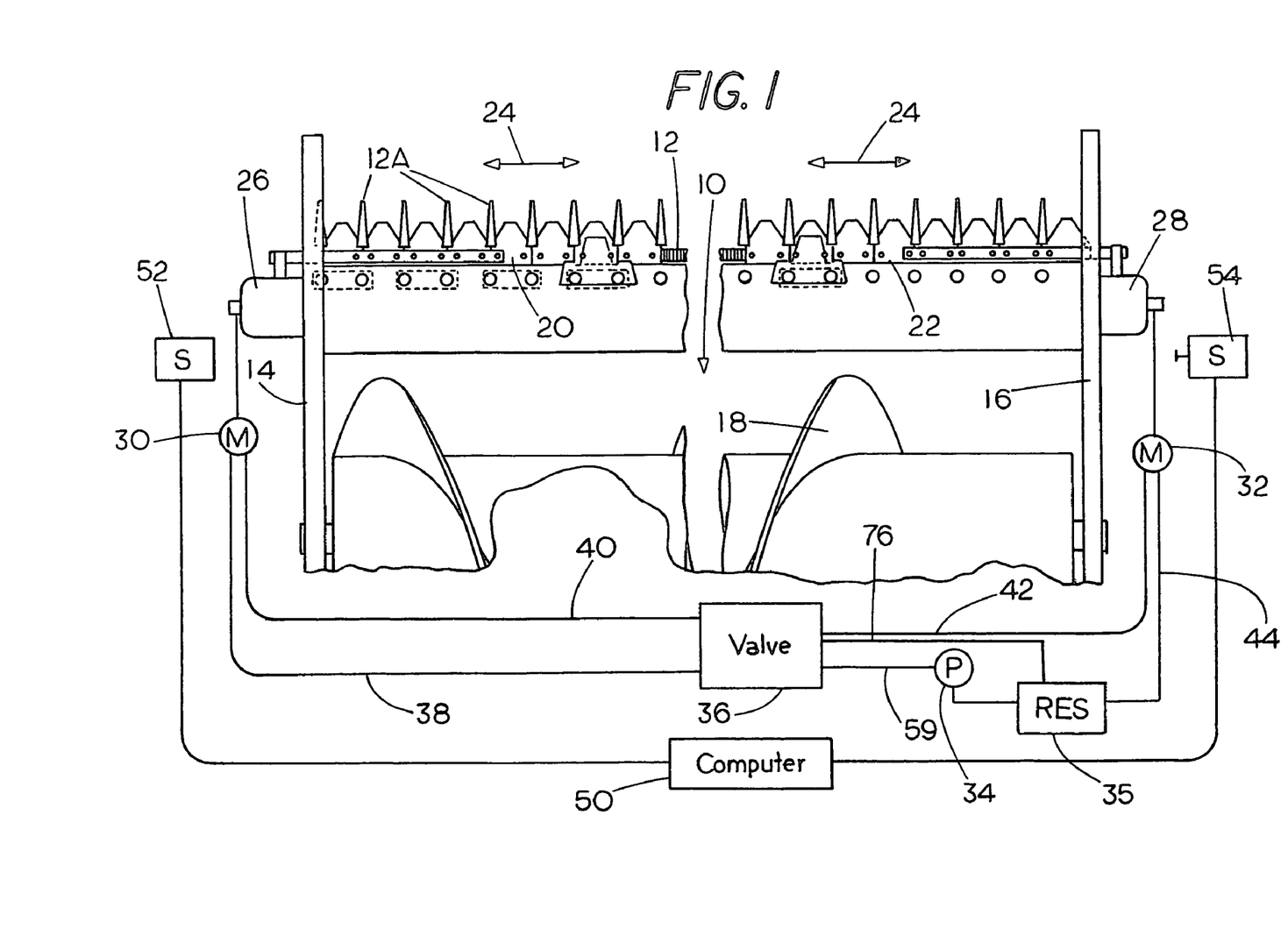
FIG. 1 is a schematic representation of a harvester header having split sickle bar sections driven to the synchronizing drive of a first form of the present disclosure.

Referring first to FIG. 1, a fragmentary portion of a harvester or combine header 10 is schematically shown. The header is shown as a combine header and has a cutter bar assembly 12 at a leading edge thereof, and divider side panels 14 and 16 along the ends of the header. The cutter bar has a main transverse support bar for supporting the sickle sections 20 and 22, and carries sickle guards 12A. The header 10 includes a feed auger 18 that would receive material cut by the pair of sickle bar sections 20 and 22 that are supported on the cutter bar assembly 12, as the harvester header is moved forwardly. The FIG. 1 showing is a schematic showing, but the header length is such that the sickle bar sections 20 and 22 are individual, and will reciprocate back and forth as indicated by the double arrows 24. At the center portions of the header the sickle bar sections will have overlap so that when in synchronization there is a clean cut where the inner ends of the sickle bar sections meet. The overlapping of the sickle bar sections does not have to be exactly at the center of the cutter bar, but can be offset slightly if the auger or a reel assembly used with the header is split, which may affect the feeding of material cut at the overlap.

The individual sickle bar sections are driven by reciprocating drives 26 and 28, respectively. Such drives can be of any desired type that converts a rotary input motion into a linear motion for reciprocating the sickle bar sections individually. A wobble drive is illustrated in U.S. Pat. No. 5,778,727. The rotary input to the wobble drives 26 and 28 is provided in the present disclosure by hydraulic motors (or belt drives in a second embodiment).

A first or master hydraulic motor 30 is used for driving the rotary input to the wobble drive 26, a second or slave hydraulic motor 32 is used for driving the rotary input to the wobble drive 28. The two motors, 30 and 32 are shown connected in series. The sickle bar sections are driven to move in opposite directions, and they will reciprocate with the inner ends of the sickle bar sections (near the center of the header) moving toward each other and then away from each other as the drive cycles. The sickle bar sections overlap for about a foot of length, when both sickle bar sections are at the ends of their inward (toward center) strokes, with the sickle knives on the sickle bar sections spaced 3 inches on center, with a 6 inch stroke. This overlap potion can be offset from the center of the cutter bar slightly, for example using one 19 foot sickle bar section with one 21 foot sickle bar section for a 40 foot cutter bar. This will give the needed overlap without causing objectionable vibration.

The motors 30 and 32 are driven from a single pump 34, connected to a hydraulic valve 36. The pump 34 provides hydraulic fluid under pressure to valve 36, which has passageways to direct the fluid under pressure first to the master motor along a line 38, and then back to the valve 36 along a flow line or conduit 40. The valve 36, as will be explained, has an internal flow control for providing a bypass flow of fluid under pressure carried from the pump and adding the bypass flow to an internal passageway connected to a flow line 42 leading to the slave motor 32. The slave motor 32 is rotated by the return flow from the master motor, and the return hydraulic oil or fluid from the slave motor is carried along a flow line 44 to the hydraulic reservoir 35.

The valve 36 is also connected to the reservoir 35 along the flow line 44.

A computer controller 50 is provided for controlling the valve 36, and in particular for controlling a bleed valve portion internally in the valve housing or block of valve 36. The computer controller 50 is powered in a suitable manner, and receives signals from proximity sensors 52 for the master drive, and 54 for the slave drive, which sensors provide signals indicating when a target on an associated motor output shaft is in a known position. The signals are processed to determine the rpm and position of the output shafts of the respective motor, and thus the position of the sickle bar sections the respective motor is driving. The sensors 52 and 54 are used to determine that the sickle bar sections are both at the ends of their strokes at the same time, and the computer controller 50 will provide the signal to adjust the internal bleed valve in the valve 36 to insure that the motors are operating at the same speed, and therefore the positions of the sickle bar sections are in sync.

Figure 2:
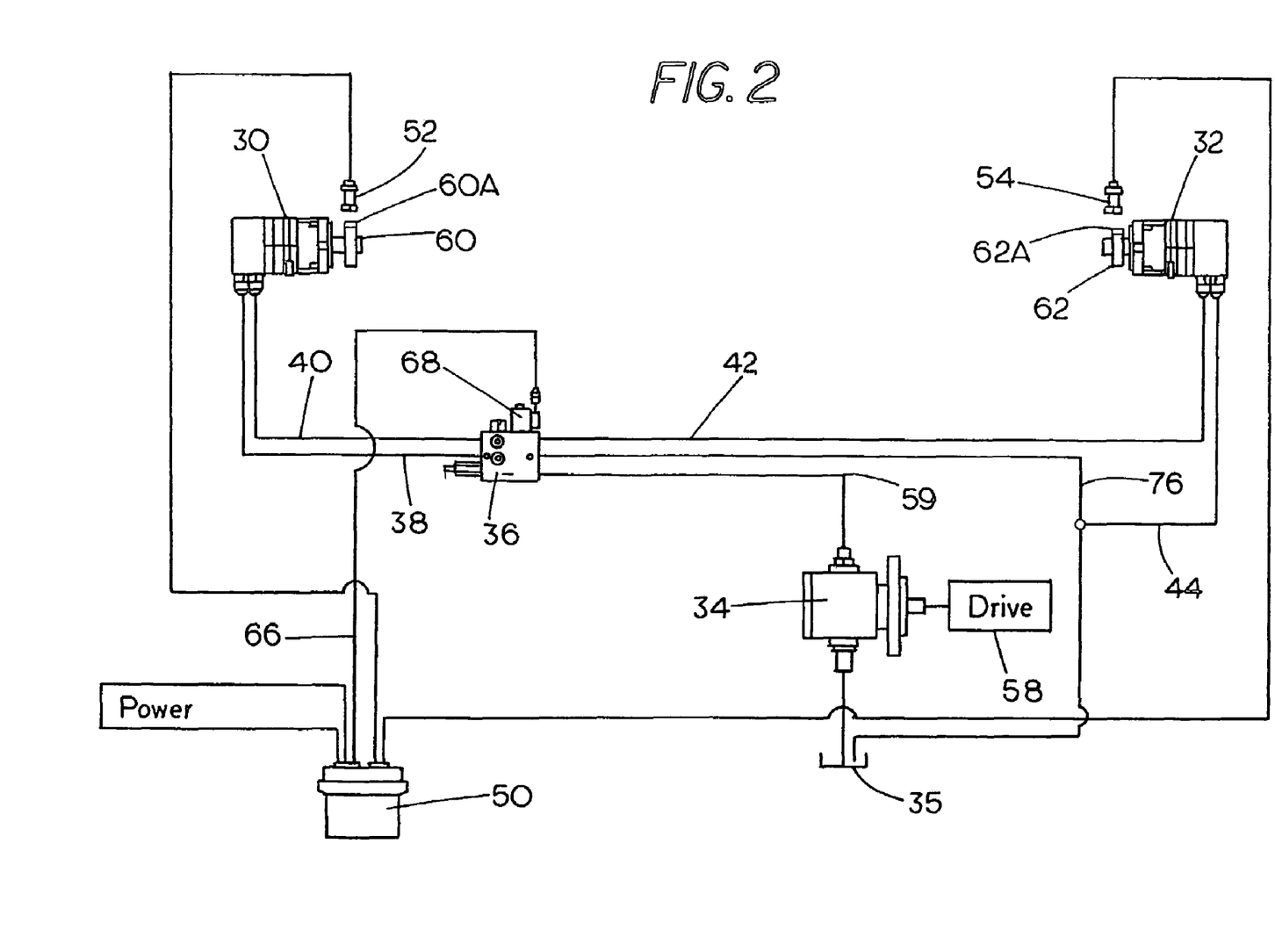
FIG. 2 is a hydraulic schematic representation of the drive for the sickle bar sections shown in FIG. 1.

Referring to FIG. 2, a more detailed schematic view is provided, and the pump 34 is shown, and is driven from a suitable drive 58, such as an internal combustion engine on the combine carrying the header 10. The pump output flow is provided along a flow line 59 to the valve 36, and the line 38 carrying the flow of fluid to the first or master motor 30 is illustrated. The return line 40 from the master motor is joined to an internal passageway in the valve 36, leading to the flow line 42 which connects to the input of the second or slave motor 32.

The return fluid from the slave motor is carried on the line 44, to reservoir 35, and one port of the valve 36 is also connected to the reservoir. The computer controller 50 receives signals from the proximity sensors or suitable other types of position sensors 52 for the master motor and 54 for the slave motor. These sensors, as illustrated schematically, are made to sense a target 60A on a rotating target disc 60 on the master motor and a target 62A on a target disc 62 on the slave motor that are aligned with the respective sensor 52 and 54 so that the sensor will provide a signal each time the respective target 60A or 62A passes as well as identify the positions of the sickle bar sections, preferably at their far end positions, right or left. This will permit the computer controller 50 to determine the rpm and stroke position of the respective master and slave drives. An output signal from the computer controller 50 for controlling a bleed valve for adjusting the slave motor speed is provided along a line 66 The bleed valve that is controlled by the signal on line 66 is a pulse width modulated solenoid valve 68 forming part of the internal flow control in passageways in the valve 36.

Figure 3:
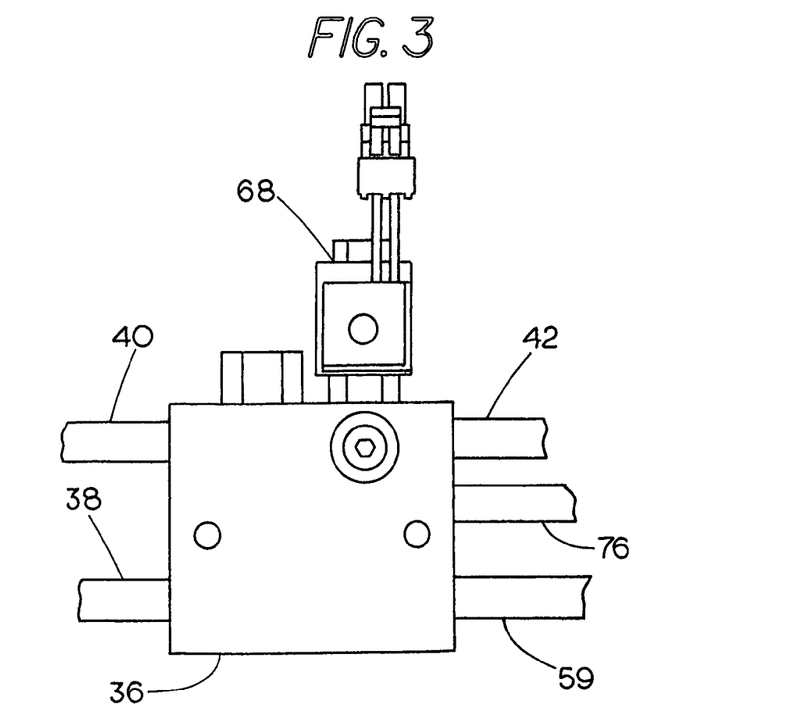
FIG. 3 is a side view of a typical valve used in the motor control of the first form of the present disclosure.

FIG. 3 illustrates the external features of valve 36 in greater detail. The pulse width modulated solenoid bleed valve, which will bleed or bypass some of the flow from line 42, is illustrated at 68 in FIG. 3. The lines leading into and out of the valve 36 are represented with the same numerals as before.

Figure 4:
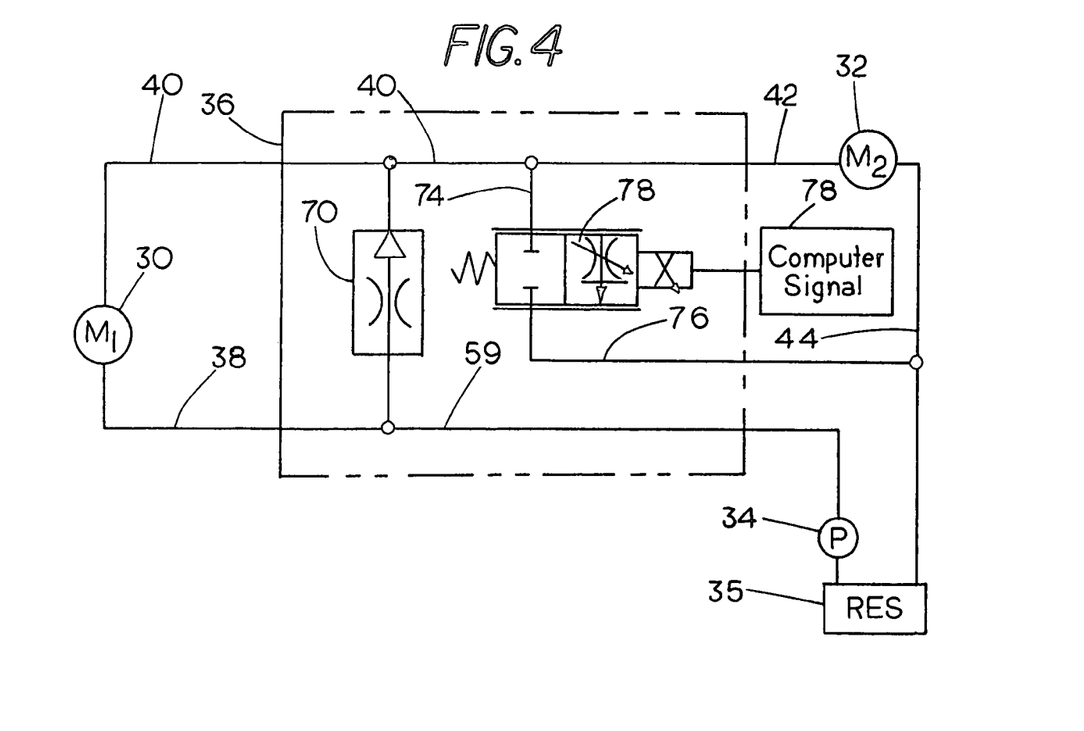
FIG. 4 is a schematic representation of the internal construction of the valve of FIG. 3.

Referring to FIG. 4, a schematic illustration of the internal construction of the valve 36 is illustrated. The flow line 59 that connects to the flow line 38 leading to the master motor 30, and the line 40 providing return oil back to the valve 36 from the master motor are illustrated. The flow line 40 joins the flow line 42 at an internal passageway in valve 36. It can be seen that internally in the valve 36 there is a flow control bypass valve 70 between the passageways for the lines 59 and 40, so that part of the flow from the line 59 is diverted into the passageway for line 40 and thus also to the line 42 leading to the second or slave motor 32. This flow control bypass valve 70 bleeds off about 0.3 gallons per minute (as an example) to result in the master motor 30 to be running at an rpm slower than that at which it would if all of the fluid flow from the pump 34 was provided to the master motor. The output side of the flow control valve 70 is connected to the internal valve passageway for lines 40 and 42, and the bypass flow through valve 70 is thus added to the return flow from the master motor.

The flow of fluid under pressure, or hydraulic oil, in the line 42 is then regulated by the computer controller 50 utilizing the pulse width modulated solenoid valve 68, that has a flow line 74 connected to the line 42 at a point where the bypass flow from the flow control valve 70 has been added to the return flow in the line 40. The computer output signal represented at 78 will operated the solenoid valve 68 so that when the pulse width modulated solenoid valve 68 is energized, part of the hydraulic fluid under pressure that is carried in line 42 is bled back to the reservoir 35 through a flow line 76.

The pulse width modulated computer signal 78 is carried from the computer controller 50 to the solenoid valve 68 at a level that is a function of the differences in the signals from the sensors 52 and 54, and is modulated to provide for the rotation of the slave motor 32 at an rpm that will match that of the master motor 30, so that the position of the targets 60A and 62A is synchronized.

Synchronization is achievable because the master motor 30 is slowed down to an rpm that is less than the difference from the maximum rpm of motor 30 at full pump flow and the reduction in rpm of the slave motor 32 normally caused by internal leakage from the master motor. In other words, the flow control valve 70 will add enough bypass hydraulic fluid under pressure into the line 42 so that the slave motor 32 could actually be run faster than the master motor 30 with that added bypass flow. The rpm's of the motors are matched by bleeding off or bypassing part of the combined return flow from motor 30 and the bypass flow from valve 70. The bleed flow for matching the motor speeds in through the solenoid bleed valve 68, as a function of the position signals from the two sensors 52 and 54.

When the sensor 52 provides an indication that the target on the motor shaft is at its desired position, the sensor 54 for the slave motor must also provide such a signal or the computer will adjust the bleed flow through valve 68 so the motor 32 rotation matches the speed and position of the master motor 30. This sampling is done about 10 times a second, so that there is constant modulation of the target position and speed signals, and a constant modulation of the valve 68.

As an example, with gear type hydraulic motors, at a rated flow of the pump 34, the master motor would rotate about 540 rpm, with a pump output of about 16 gallons per minute. Because of internal leakage, the slave motor 32 would get about 15.9 gallons per minute and run at about 536 rpm. This 4 rpm difference will cause the sickle bar sections to go in and out of timing or synchronization, essentially every 15 seconds. During the 15 second periods when the sickle bar sections are out of time, the overlap length of the sickle bar sections in the center of the header would go from ideal cutting to stripping and pulling the crop. There would also be a sickle bar imbalance during these 15 second non synchronous operation periods. With the present disclosure, by having the bypass flow control valve 70 bypassing part of the flow to the master motor 30 the master motor is slowed down to about 530 rpm with a bleed of about 0.3 gallons per minute, so it is running slower than the slave motor would run, taking into account the normal leakage which reduces the return flow from the master motor to the slave motor.

The bypass flow from the flow control valve 70, as shown, is capable of being diverted entirely to the second or slave motor 32, so that the slave motor could actually run faster than the master motor 30 if needed. However, by detecting the rpm and timing difference of the two motors, the computer controller can slow down or speed up the second or slave motor to match the rpm of the master motor and keep the sickle bar sections reaching the ends of their strokes at the same time. This is done by the signals that are received by the computer controller and the opening and closing of the solenoid valve 68 to bleed off a sufficient amount of fluid from the line 42 to match the speeds. A suitable valve for carrying out the speed regulation of the master and slave motors is available from Sun Source, 12800 Highway 13 South #100, Savage, Minn. 55378.

Other types of hydraulic motors can be used, and the efficiency of motors such as piston motors, vane motors or georotor motors may be different from that of the example of gear motors. The bypass flow and flow to the slave motor would be adjusted accordingly.

Figure 5:
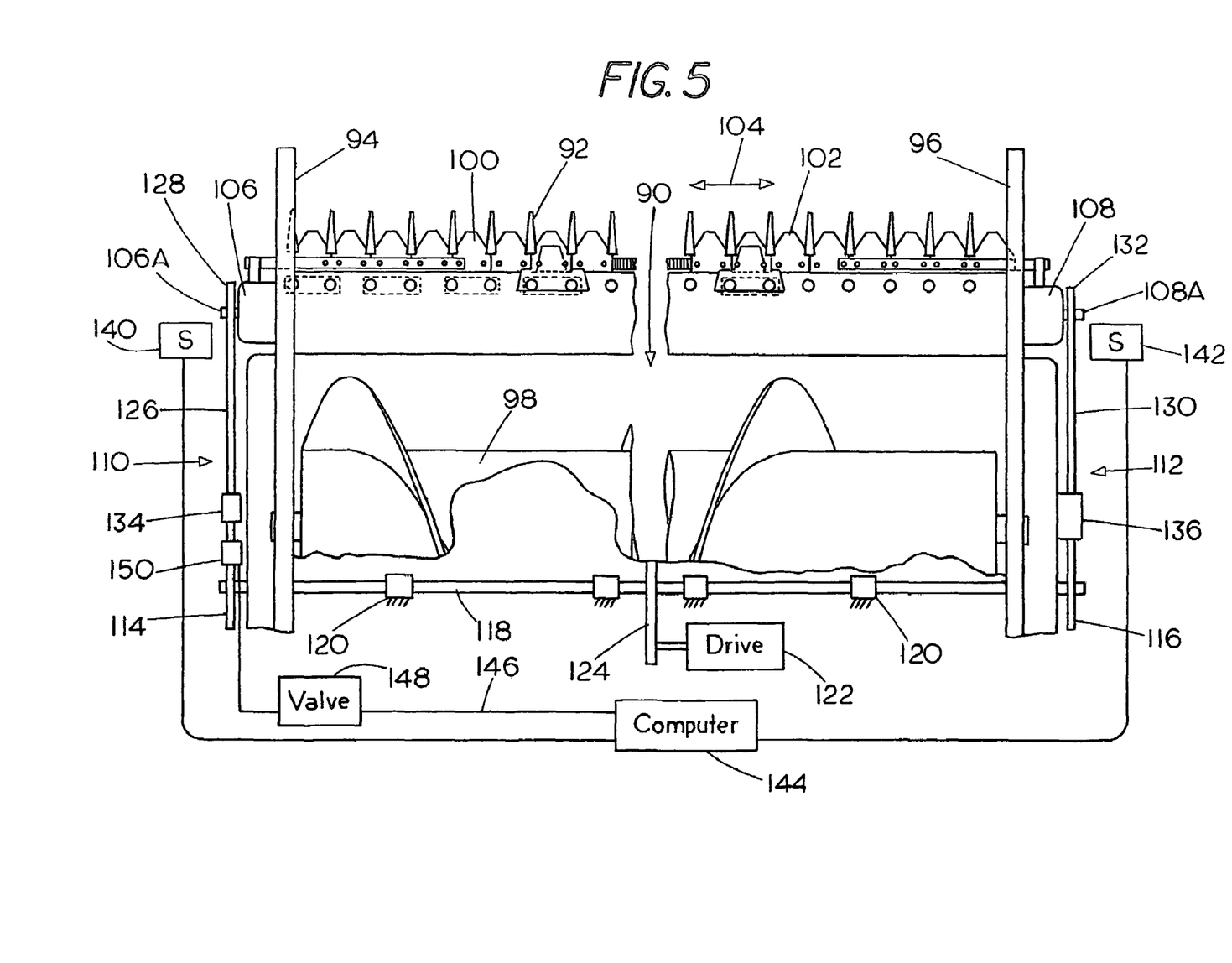
FIG. 5 is a schematic representation of a harvester header similar to FIG. 1, showing a second form of a synchronizing drive for a split sickle bar.
Figure 6:
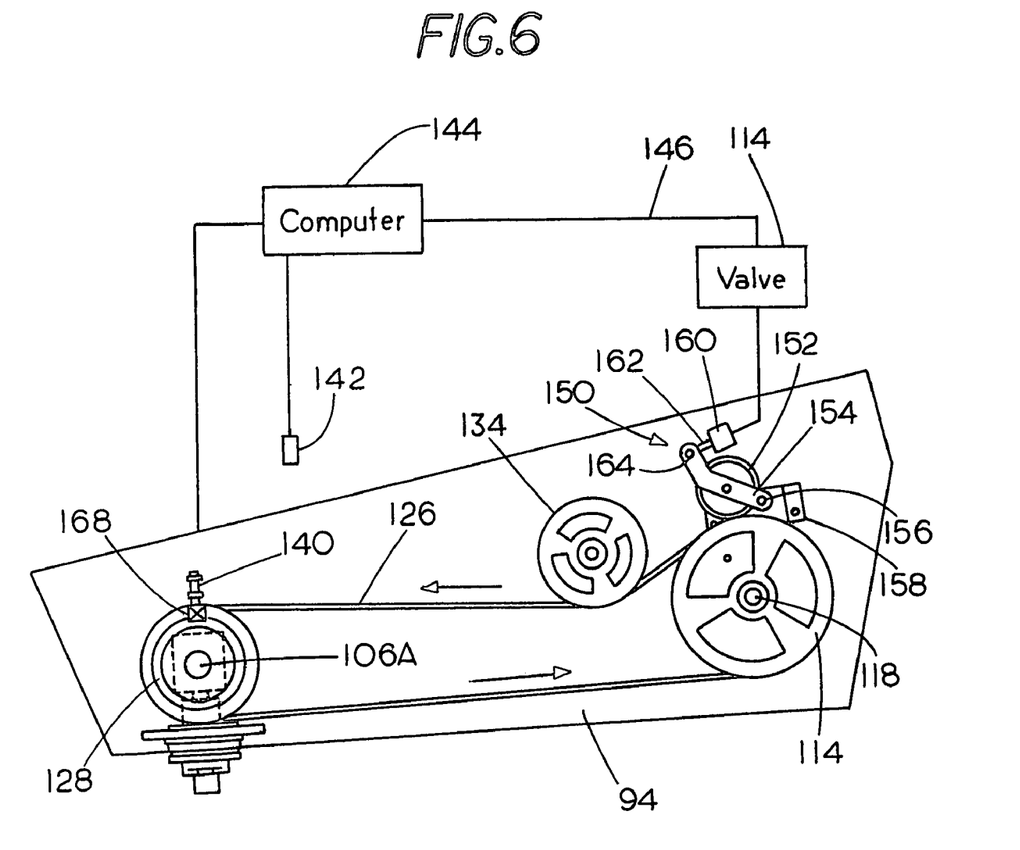
FIG. 6 is a side end view of the header in FIG. 5.

The drive arrangement is illustrated schematically in FIGS. 5 and 6, and in FIG. 5, fragmentary portion on the harvester or combine header 90 is illustrated, and is oriented to FIG. 1 except that in this case the adjustable drive is on the left hand side of the header. The header is a cutter bar assembly 92 of conventional design and a leading edge thereof, and divider side panels 94 and 96, respectively. An infeed auger 98 is provided for receiving material cut by the individual sickle bar sections which are indicated at 100 and 102. The individual sickle bar sections overlap slightly in the middle in a conventional manner, and will reciprocate back and forth as indicated where the double arrow 104. The overlap at the center portions of the sickle bar sections is conventionally provided so that there is a clean cut of the crop for the inner ends of the sickle bar sections meet. Also, there is a rotary input, linear output drive, such as the wobble drive previously described, on each of the ends of the header. A first wobble drive 106 is on the left hand side and the second drive 108 is on the right hand side.

In this form of the invention, the rotary inputs, which comprise rotary shafts indicated at 106A and 108A for the rotary to reciprocating drives are driven by belts, preferably the V-belt drives, which have, under normal tensions, approximately 4-7% slippage. Because the belt slippage can vary between the separate belts on the opposite sides of the header that drive the motor input shafts 106A and 108A, the present disclosure teaches regulating the friction between one of the drives and using the sensors as previously described to insure the speed and position of the sickle bar section are matched.

There is a drive assembly 110 on the left hand side of the header and a drive assembly 112 on the right hand side. The drive pulleys 114 and 116, respectively, as shown schematically, are driven from a common shaft 118. The shaft 118 is illustrated as being supported across the width of a header, but any suitable synchronized drive that will drive the drive pulleys 114 and 116 at the same speed can be used. Suitable bearings 120 are provided for supporting the shaft as needed. A power drive for the shaft 118 is illustrated at 122 and utilizes a positive drive link for chain 124 to rotate the shaft. This showing is for illustrative purposes only, and various types of drives can be used for the shaft. Power drive 122 would be a suitable motor, or a power drive from the combine engine.

The drive pulley 114 on the left hand side drives a V-belt 126, which in turn drives a driven pulley 128 that drives the shaft 106A. On the right hand side, a V-belt drive pulley 116 drives a V-belt 130, which in turns drives a driven pulley 132 mounted on and driving the shaft 108A.

A conventional belt tightener pulley assembly is provided on each of the V-belts 126 and 130 and is illustrated schematically at 134 on the left hand side and 136 on the right hand side. FIG. 6 illustrates the left hand drive, and except for the adjustable synchronizing friction control member or pulley, the drives on the opposite sides of the header are identical.

As illustrated schematically, a proximity sensor 140 is used for sensing a position target on the pulley 128, and a proximity sensor 142 is utilized for sensing a position on the pulley 132.

The position signals from sensors 140 and 142 are provided to a central computer or controller 144, which will compare the signals from the sensors and will provide an output along the line 146 to a suitable control, in this case a valve 148, which adjusts the position of a belt slip adjustment or synchronizing assembly 150. Referring to FIG. 6, it is again understood that the drive belt 130 on the right hand side of the header shown in FIG. 5 will be adjusted to slip a selected amount, for example approximately 4-7% or slightly more, and the slip adjustment assembly 150 will be used to adjust the slippage of the belt 126 so the speed of rotation and position of the shaft 106A matches the speed of rotation and position of the shaft 108A. The belt 130 will not be adjusted during the synchronizing operation.

The slip adjustment or synchronizing assembly 150 in the form shown, includes a synchronizing drive friction or slip adjustment control pulley 152 that is rotatably mounted onto an arm assembly 154. The arm assembly 154 is pivoted as at 156 on a bracket 158 attached to the divider panel 94. The position of arm 154 about pivot 156 is controlled by the use of a fluid pressure cylinder, such as a pneumatic or hydraulic cylinder 160 that is mounted to the harvester header at its base end, and has an extendable and retractable rod 162 that is mounted as at 164 to the opposite end of the arm assembly 154 from its pivot 156. The pulley 152 is a synchronizing drive friction control or slip adjustment pulley and it rides against the outer surface of the belt 126 at a suitable location on the drive area of the drive pulley 114, preferably at the tangent point where the V-belt is exiting the pulley 114, or slightly before the belt is no longer contacting the drive surfaces of the pulley 114. The position of the pulley 152 at the belt tangent point where the belt exits the pulley 114 provides substantial control of belt drive friction with little movement of the pulley 152.

The tightener pulley 134 can be eliminated so the friction control pulley 153 is used alone, if the belt whip on the slack side or reach of the belt is not a problem. A pulley at other locations on the slack reach or side of the belt 126 can be used for control, but greater movement to change the belt drive friction is needed, so rapid control is more difficult.

As shown, the friction control pulley 152 can be mounted above the drive pulley 114 and close to it, and as the actuator 160 is moved to urge the pulley 152 against the belt 126, the amount of slippage of the belt 126 will be controlled because the friction will be increased as the belt is pressed more tightly into the V-belt groove on the pulley 114. Thus the pulley 152 is used to urge the belt 126 more tightly or less tightly into the V-groove of the drive pulley 114. The pulley 152 will fit into the groove of pulley 114. Valve 148 (or other actuator control) is used to control the position of the actuator 160 and the rod 162 in response to the signals that are provided by the computer 144. The computer output signal is provided to the input of the valve 114 is a function of any differential in the signals from the sensors 140 and 142. Other actuators can be used for controlling the position of pulley 152, in place of a fluid pressure cylinder, such as a linear screw actuator, servo drives or the like.

Schematically shown is a suitable target 168 on the driven pulley 128 which drives the shaft 106A. A similar target would be used on the driven pulley 132 on the right hand side of the header.

Again, the amount of slippage on the right hand side belt, which would be the master control that would be used as a basis for the matching of the speed and position of the left hand drive, is made so that the shaft 108A will be rotating at a slightly slower than normal drive speed, to permit the drive friction and thus the tension in the lower reach of the belt 126 (or the belt slippage) to be changed sufficiently so that the speeds and positions of the sickle bar sections can be matched.

The use of the synchronizing drive is again based upon the sensor signals that match the speed of input on the shaft 106A and position of the mechanically connected sickle bar section that is associated with that drive, to the drive on the other side.

When using a belt drive, the drive may be from a single power shaft, and the proximity sensors can be used for sensing position of the sickle bar sections directly, or use some other flag or target that would indicate when each of the sickle bar sections is at the opposite ends of the respective reciprocating stroke. The signal would be used by a computer, as shown, but would be used to adjust the belt drive friction causing tension in the drive side or reach of one of the belts to control slippage so that the sickle bar sections could remain in synchronous operation.

In summary, the belt 130 for right hand sickle bar section in FIG. 5 preferably is set at a tension providing substantially normal slippage of the belt drive to the input 108A of drive 108 at a suitable rpm. The synchronizing belt tightener assembly 150 for the belt 126 for driving the shaft 106A of drive 106 is controlled with an actuator to provide more belt drive friction or less belt drive friction by controlling the belt friction on the V-groove of pulley 114 so the shaft 106A matches the speed of the right hand drive. The actuator 160 is operated with a valve 148, that responds to signals from the computer controller 144 derived from the signals indicating sickle bar section positions. The actuator 160 adjusts the slippage of the belt 126 to provide an rpm and position for the input shaft 106A of the drive 106 that matches the input rpm and position of shaft 108A of the drive 108.

The synchronizing adjustment is designed to operate within a range of speed differentials for normal operation, but since the sickle bar sections are individually driven and the cutter bar is long, one sickle section may encounter loads that slow the drive more than can be adjusted quickly. If for example the slave motor is loaded so it is slowed and cannot be brought up to match the master motor speed, there would be non-synchronization during the time of mismatched speeds, but as soon as the load is reduced, the slave motor would again speed up to match the speed and position of the master.

Although the present invention has been described with reference to preferred embodiments, workers skilled in the art will recognize that changes may be made in form and detail without departing from the spirit and scope of the invention.

What is claimed is:

1. A drive arrangement for reciprocating a pair of movable elongated sickle bar sections on a harvester that are linearly reciprocated in opposite directions, a separate power drive to individually drive each of the sickle bar sections in reciprocating paths, a separate sensor to sense a position of each of the sickle bar sections at a known location of the respective reciprocating paths, a controller coupled to receive signals from the sensors based upon the sensed positions of the sickle bar sections and providing an output, and at least one of the power drives being operable to vary the speed of operation of the sickle bar section driven by the at least one power drive, and the at least one power drive being coupled to the controller to receive the output to control the speed of operation of the sickle bar section driven by the at least one power drive to synchronize the signals from the sensors indicating that the reciprocating sickle bar sections have reached the known location of the respective reciprocating path.

2. The drive of claim 1 wherein the power drives comprise first and second hydraulic motors, the controller varying flow to at least one of the motors comprising the at least one power drive to synchronize the signals from the sensors.

3. The drive of claim 2, wherein the first and second motors have output shafts with sensor readable indicia thereon to indicate the position of output shafts of each of the motors, and a non-slipping drive connection between the output shafts and the respective reciprocating member section.

4. The drive of claim 1, wherein said sickle bar sections are mounted on a cutter bar, and the power drives for the sickle bar sections being at opposite ends of the cutter bar.

5. The drive of claim 1 wherein the known location of each path comprises an end of the respective reciprocating path.

6. A drive arrangement for reciprocating a pair of movable elongated sickle bar sections on a harvester that are linearly reciprocated in opposite directions, a separate power drive to individually drive each of the sickle bar sections in reciprocating paths, a separate sensor to sense a position of each of the sickle bar sections at a known location of the respective reciprocating paths, a controller coupled to receive signals from the sensors and providing an output, and at least one of the power drives being operable to vary the speed of operation of the sickle bar section driven by the at least one power drive, and the at least one power drive being coupled to the controller to receive the output to control the speed of operation of the sickle bar section driven by the at least one power drive to synchronize the signals from the sensors indicating that the reciprocating sickle bar sections have reached the known location of the respective reciprocating path, wherein the power drives comprise first and second hydraulic motors, the controller varying flow to at least one of the motors comprising the at least one power drive to synchronize the signals from the sensors, wherein first and second said hydraulic motors are connected in series, with fluid under pressure being directed from a source of hydraulic fluid under pressure to a first motor, and from the first motor to the second motor, and a bypass flow control to bypass a portion of flow from the source prior to the flow reaching the first motor to a passageway carrying return flow from the first motor to the second motor, and the output from the controller controlling a valve open to the passageway open to control the flow of fluid to the second motor.

7. A drive arrangement for reciprocating a pair of movable elongated sickle bar sections on a harvester that are linearly reciprocated in opposite directions, a separate power drive to individually drive each of the sickle bar sections in reciprocating paths, a separate sensor to sense a position of each of the sickle bar sections at a known location of the respective reciprocating paths, a controller coupled to receive signals from the sensors and providing an output, and at least one of the power drives being operable to vary the speed of operation of the sickle bar section driven by the at least one power drive, and the at least one power drive being coupled to the controller to receive the output to control the speed of operation of the sickle bar section driven by the at least one power drive to synchronize the signals from the sensors indicating that the reciprocating sickle bar sections have reached the known location of the respective reciprocating path, wherein the separate power drives comprise belt drives to the separate sickle bar sections, respectively, each belt drive comprising a drive pulley and a driven pulley, a separate belt drivably connecting each drive pulley and driven pulley, and a belt friction control responsive the output of the controller for adjusting slippage of one of the belt drives comprising the at least one power drive to vary the speed of operation.

8. The drive of claim 7 wherein the separate belts comprise V belts.

9. The drive of claim 7 wherein the belt friction control comprises a belt tightener engaging the belt of the one of the belt drives and an actuator to control the position of the belt tightener in response to the output signal.

10. The drive of claim 9 wherein the actuator comprises a fluid pressure actuator.

11. A synchronous drive control for a pair of sickle bar sections mounted on a header support of a harvester each of the sickle bar sections reciprocating in a linear path, the sickle bar sections moving in opposite directions in the respective linear path, a separate drive for each of the sickle bar sections at opposite ends of the header, said separate drives each comprising a hydraulic motor, a drive member for converting rotary motion of the motor into the linear motion for defining the reciprocating path of each of the sickle bar sections, the hydraulic motors being driven from a pump providing fluid under pressure to the first of the motors, and fluid under pressure to an input of the second motor, a bypass valve to bypass a selected amount of fluid from the pump to the input of the second motor, and an adjustable control valve to control fluid flow in the input to the second motor, separate sensors to determine known positions of the respective sickle bar sections, and a controller for receiving the signals from the separate sensors based upon the determined positions of the sickle bar sections and adjusting the adjustable control valve to bleed off fluid provided to the second motor to regulate the speed and position of the second motor to match the speed and position of the first motor.

12. The synchronous drive of claim 11 wherein the first and second motors each carry a target rotating with an output shaft of the respective motor, the targets being sensed by the respective separate sensor.

13. A synchronous drive control for a pair of sickle bar sections mounted on a header support of a harvester each of the sickle bar sections reciprocating in a linear path, the sickle bar sections moving in opposite directions in the respective linear path, a separate drive for each of the sickle bar sections at opposite ends of the header, said separate drives each comprising a hydraulic motor, a drive member for converting rotary motion of the motor into the linear motion for defining the reciprocating path of each of the sickle bar sections, the hydraulic motors being driven from a pump providing fluid under pressure to the first of the motors, and fluid under pressure to an input of the second motor, a bypass valve to bypass a selected amount of fluid from the pump to the input of the second motor, and an adjustable control valve to control fluid flow in the input to the second motor, separate sensors to determine known positions of the respective sickle bar sections, and a controller for receiving the signals from the separate sensors and adjusting the adjustable control valve to bleed off fluid provided to the second motor to regulate the speed and position of the second motor to match the speed and position of the first motor, wherein the bypass flow control valve discharges the bypass fluid flow to the input of the second motor in a series fluid connection from the first motor at a location in the fluid connection more remote from the second motor than a coupling of the adjustable control valve to the input to the second motor.

14. The synchronous drive of claim 13 wherein the pump is coupled to the first motor by a first flow line and the series connection from the first motor to the second motor comprises a second flow line, a valve body having portions of both the first and second flow lines therein, the bypass valve and the adjustable control valve being in the valve body.

15. A method of synchronizing the movement of a pair of linearly movable reciprocating sickle bar sections mounted onto a cutter bar of a harvester comprising individually driving the reciprocating sickle bar sections in reciprocal paths, sensing the position of the sickle bar sections in their respective paths, and controlling the speed and position of one of the reciprocating sickle bar sections with respect to the other reciprocating sickle bar section in response to signals from the sensors based upon the sensed positions of the sickle bar sections.

16. The method of claim 15 wherein individually driving the respective reciprocating sickle bar sections comprises driving the reciprocating sickle bar sections with hydraulic motors that are substantially identical, providing a pump flow to a first of the motors and bypassing a selected portion of the pump flow prior to introduction into the first motor, connecting a passageway into which the bypass fluid is introduced through a connection to the second motor, providing a second controllable bleed valve between the connection of the bypass fluid to the passageway and the second motor, and controlling the amount of fluid that is driving the second motor by bleeding off fluid from the passageway in response to the signals indicating the position of the respective reciprocating sickle bar sections.

17. The method of claim 15 including providing sensor targets for sensing positions of the reciprocating sickle bar sections.

18. The method of claim 15 including providing mechanical wobble drives driven by rotating shafts of the first and second motors for reciprocating the sickle bar sections.

19. A method of synchronizing the movement of a pair of linearly movable reciprocating sickle bar sections mounted onto a cutter bar of a harvester comprising individually driving the reciprocating sickle bar sections in reciprocal paths, sensing the position of the sickle bar sections in their respective paths, and controlling the speed and position of one of the reciprocating sickle bar sections with respect to the other reciprocating sickle bar section in response to the signals from the sensors, the method further comprising driving the reciprocating sickle bar sections with belt drives, permitting one of the belt drives to slip a selected amount relative to the other belt drive, and controlling slip of the one belt drive in response to the signals from the sensors to match the speed and position of an associated reciprocating sickle bar section with respect to the other reciprocating sickle bar section.

20. A synchronous drive control for a pair of sickle bar sections mounted on a header support of a harvester each of the respective sickle bar sections reciprocating in a linear path, the sickle bar sections moving in opposite directions in the linear path, a separate drive for each of the sickle bar sections at opposite ends of the header, said separate drives each comprising a rotary drive member and a portion converting rotary motion into linear motion for defining the reciprocating path of each of the sickle bar sections, at least one drive member comprising an adjustable rotary drive portion adjustable in rotary speed in response to signals at an input, separate sensors to determine known positions of the sickle bar sections in their reciprocating paths, and a controller for receiving signals from the separate sensors based upon the determined positions of the sickle bar sections and providing a signal to the input which is a function of the positions of the sickle bar section to regulate rotary speed of the one drive member and a position of its associated sickle bar section to match rotary speed of the other drive member and the known position of the sickle bar section driven by the other drive member.

21. The synchronous drive of claim 20 wherein the drive members each carry a target sensed by the respective separate sensor.

* * * * *